(12) United States Patent
Haraguchi

(10) Patent No.: US 11,091,010 B2
(45) Date of Patent: Aug. 17, 2021

(54) VEHICLE SUN VISOR

(71) Applicant: KYOWA SANGYO CO., LTD., Toyota (JP)

(72) Inventor: Takashi Haraguchi, Toyota (JP)

(73) Assignee: KYOWA SANGYO CO., LTD., Toyota (JP)

( * ) Notice: Subject to any disclaimer, the term of this patent is extended or adjusted under 35 U.S.C. 154(b) by 43 days.

(21) Appl. No.: 16/642,928

(22) PCT Filed: Aug. 29, 2018

(86) PCT No.: PCT/JP2018/032036
§ 371 (c)(1),
(2) Date: Feb. 28, 2020

(87) PCT Pub. No.: WO2019/044935
PCT Pub. Date: Mar. 7, 2019

(65) Prior Publication Data
US 2020/0346529 A1    Nov. 5, 2020

(30) Foreign Application Priority Data

Sep. 1, 2017 (JP) .............................. JP2017-168748

(51) Int. Cl.
*B60J 3/02* (2006.01)
(52) U.S. Cl.
CPC ............ *B60J 3/0282* (2013.01); *B60J 3/0213* (2013.01)

(58) Field of Classification Search
CPC ..................................................... B60J 3/0282
See application file for complete search history.

(56) References Cited

U.S. PATENT DOCUMENTS

| | | | | |
|---|---|---|---|---|
| 5,441,325 A | * | 8/1995 | Toth ....................... | B60J 3/0282 296/97.2 |
| 6,692,060 B1 | * | 2/2004 | Wilson .................. | B60J 3/0282 296/97.1 |
| 2012/0112490 A1 | | 5/2012 | Fukatsu | |
| 2018/0304816 A1 | * | 10/2018 | Welter ................... | B60J 3/0282 |

FOREIGN PATENT DOCUMENTS

JP          2012-101623 A      5/2012

* cited by examiner

*Primary Examiner* — Joseph D. Pape
(74) *Attorney, Agent, or Firm* — Oliff PLC

(57) ABSTRACT

A mirror unit includes a frame provided separately from or integrally with the one half body, a mirror and slide cover attached to the frame, a slide mechanism that allows slide cover to slide between an open position at which a mirror surface of the mirror is exposed and a closed position at which the slide covers the mirror surface of mirror, relative to the frame, and a position holding mechanism capable of holding slide cover via the slide mechanism at the closed and open position. W1, a distance between pair of resin springs in a natural state>W3, a distance between pair of main guide rails 41>W5, respective distances between the protrusion portions facing each other at the pair of main guide rails, and W3, the distance between pair of main guide rails 41>W4, a distance between the pair of auxiliary guide rails.

2 Claims, 13 Drawing Sheets

VEHICLE SUN VISOR

TECHNICAL FIELD

The present invention relates to a vehicle sun visor and specifically relates to a vehicle sun visor including a sun visor body formed of a pair of shell-like half bodies and a mirror unit fitted in one half body of the sun visor body.

BACKGROUND ART

Conventionally, sun visors are attached to vehicles, such as automobiles, as sun-shade members for protecting occupants in the driver seat and front passenger seat from direct sunlight to ensure the occupants' vision. Such sun visors are each formed of a substantially-rectangular sun visor body and an arm for attaching the sun visor body to the vehicle side (body of the automobile) in such a manner that the sun visor body is pivotable between a usable position and a folded position. A mirror unit that the occupant can use when the sun visor body is at the usable position is attached to the sun visor body. The mirror unit includes a frame, a mirror attached to the frame, a slide cover attached to the frame, a slide mechanism that allows the slide cover to slide between an open position at which a mirror surface of the mirror is exposed and a closed position at which the slide cover covers the mirror surface of the mirror, relative to the frame, and a position holding mechanism capable of holding the slide cover slid via the slide mechanism at the open position and the closed position. The slide mechanism is capable of preventing adherence of dust and dirt to the mirror surface when the mirror is not used. In addition, the position holding mechanism is capable of preventing movement of the slide cover at the open position and the closed position.

CITATION LIST

Patent Literature

Patent Literature 1: Japanese Patent Application Publication No. 2012-101623

SUMMARY OF THE INVENTION

Technical Problem

However, in the aforementioned technique in Patent Literature 1, backlash may occur in the slide cover that is slid.

The present invention is intended to solve the aforementioned problem and an object of the present invention is to provide a vehicle sun visor that prevents occurrence of backlash in a slide cover that is slid.

Solution to Problem

The present invention is intended to achieve the above object and is configured as below.

The invention according to claim 1 provides a vehicle sun visor including a sun visor body including a pair of shell-like half bodies, and a mirror unit fitted in one half body of the sun visor body. The mirror unit includes a frame provided separately from or integrally with the one half body, a mirror attached to the frame, a slide cover attached to the frame, a slide mechanism that allows the slide cover to slide between an open position at which a mirror surface of the mirror is exposed and a closed position at which the slide cover covers the mirror surface of the mirror, relative to the frame, and a position holding mechanism capable of holding the slide cover slid via the slide mechanism at the closed position and the open position. The slide mechanism includes a pair of main guide rails that guide opposite edges of a slide that allows the slide cover to slide. The position holding mechanism includes a pair of resin springs formed at the opposite edges of the slide of the slide cover, the opposite edges being guided by the slide mechanism, first protrusion portions formed at the pair of main guide rails so as to face each other, the first protrusion portions restricting sliding of the resin springs so as to hold the slide cover at the closed position, second protrusion portions formed at the pair of main guide rails so as to face each other, and the second protrusion portions restricting sliding of the resin springs so as to hold the slide cover at the open position. A pair of auxiliary guide rails that when the slide cover is slid from the closed position toward the open position, guides the opposite edges of the slide of the slide cover advanced from the pair of main guide rails being formed at an inner surface of the one shell. Among a distance between the pair of resin springs in a natural state, a width between the opposite edges of the slide of the slide cover, a distance between the pair of main guide rails, a distance between the pair of auxiliary guide rails and respective distances between the protrusion portions facing each other at the pair of main guide rails, the distance between the pair of resin springs in a natural state>the distance between the pair of main guide rails>the respective distances between the protrusion portions facing each other at the pair of main guide rails, and the distance between the pair of main guide rails>the distance between the pair of auxiliary guide rails.

With the invention according to claim 1, the distance between the pair of resin springs in a natural state>the distance between the pair of main guide rails, and thus, when the slide cover is slid, the pair of resin springs are bent. Therefore, backlash of the slide cover during the sliding can be curbed. Also, since the distance between the pair of main guide rails>the distance between the pair of auxiliary guide rails, in the pair of auxiliary guide rails, backlash caused by sliding of the slide cover on the pair of auxiliary guide rails can be curbed even though the pair of resin springs of the slide cover do not work. Also, since the distance between the pair of main guide rails>the distance between the first protrusion portions facing each other and the distance between the second protrusion portions facing each other. Therefore, the slide cover can be held at the open position and the closed position. Also, the pair of resin springs of the slide cover are slightly bent except when the pair of resin springs climb over the pair of first protrusion portions and the pair of second protrusion portions. Therefore, plastic deformation of the pair of resin springs can be prevented.

Also, the invention according to claim 2 provides the vehicle sun visor according to claim 1, wherein guide pieces that hold the pair of resin springs of the slide cover at the open position of the slide cover is formed at respective end portions of the pair of main guide rails.

With the invention according to claim 2, holding of the pair of resin springs of the slide cover at the open position can be performed by the guide pieces. Such performance prevents the pair of resin springs from plastic deformation when the pair of resin springs are held because the guide pieces a bending property. In other words, holding of the slide cover at the open position can be performed without plastic deformation of the pair of resin springs of the slide cover.

MODES FOR CARRYING OUT THE INVENTION

Embodiments of the present invention will be described below with reference to the drawings.

First Embodiment

First, a first embodiment of the present invention will be described with reference to FIGS. 1 to 9. Note that in the below description, as an example of "vehicle sun visor 1", "sun visor 1 on the right side of an automobile (not illustrated) (simply referred to as "sun visor 1")" will be described. Also, in the below description, "up" and "upper", "down" and "lower", "front", "rear", "left" and "right" denote directions of "up", "down", "front", "rear", "left" and "right" indicated in FIGS. 1 to 3, that is, directions of "up", "down", "front", "rear", "left" and "right" in a plan view of an outer surface 15 of one half body 3 of the sun visor 1, respectively.

Figure 1:
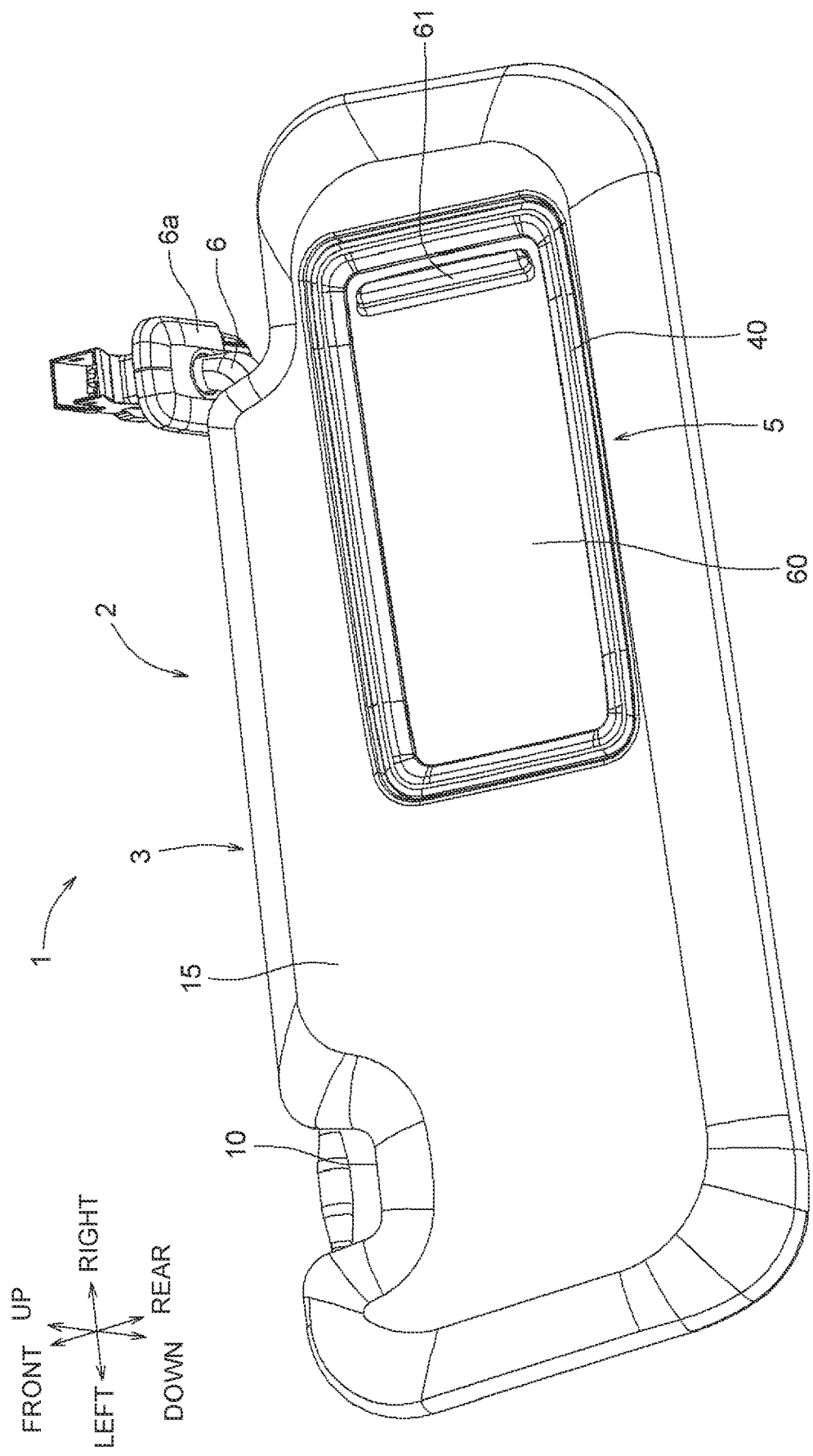
FIG. 1 is a perspective view of a vehicle sun visor according to a first embodiment.

As illustrated in FIG. 1, the sun visor 1 includes a rectangular (horizontally-long) sun visor body 2, a substantially L-shaped arm 6 for attachment of the sun visor body 2 to the automobile, and a coating (not illustrated) coating the sun visor body 2. Note that the coating is a publicly known one and illustration of the coating will be omitted for easy viewing of the structure of the sun visor body 2. In the below, the sun visor body 2 and the arm 6 will be described individually.

First, the sun visor body 2 will be described with reference to FIGS. 1 to 3 and 7. The sun visor body 2 is formed of a pair of shell-like half bodies 3, 4.

Figure 2:
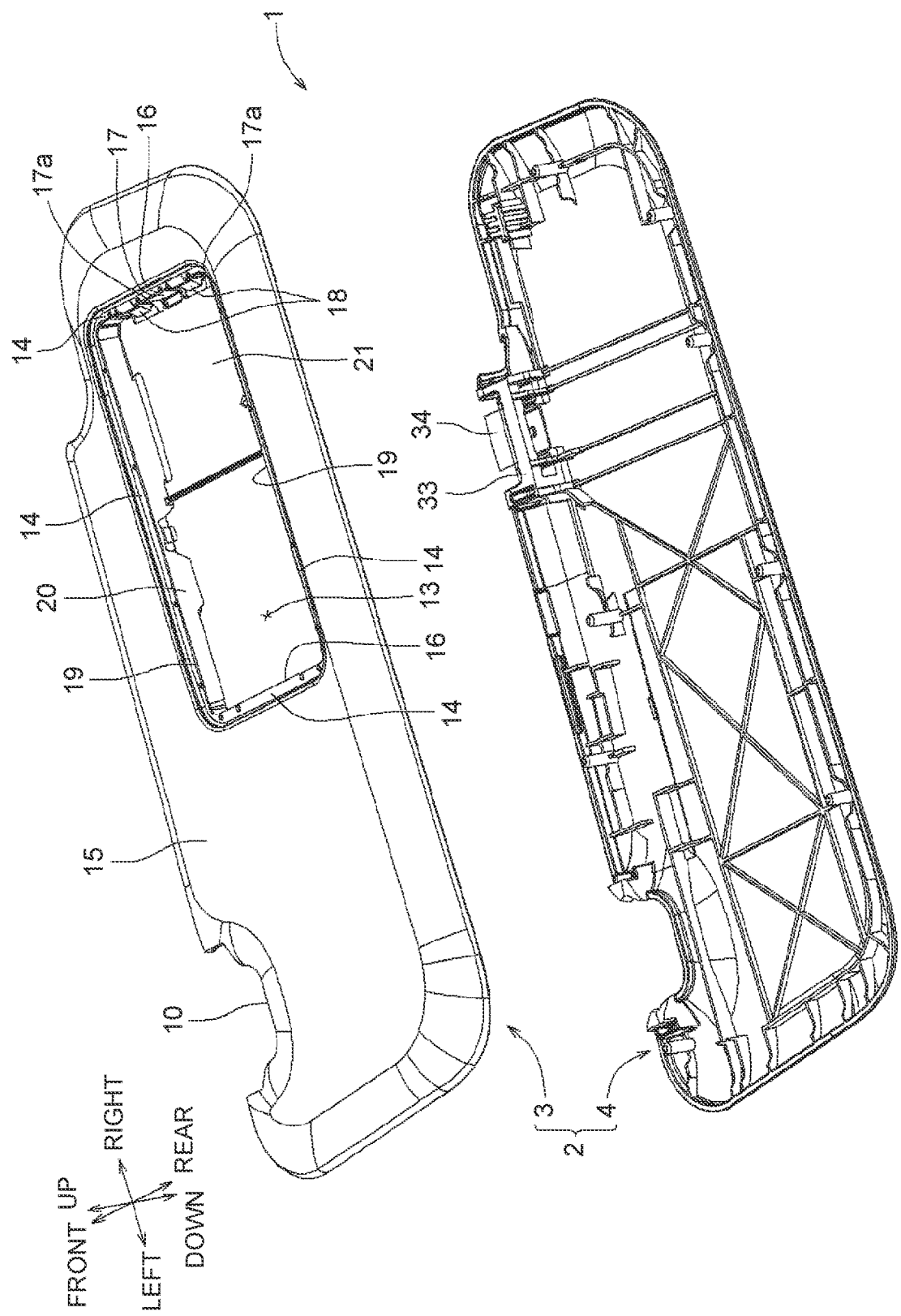
FIG. 2 is an exploded view of the sun visor body in FIG. 1.
Figure 3:
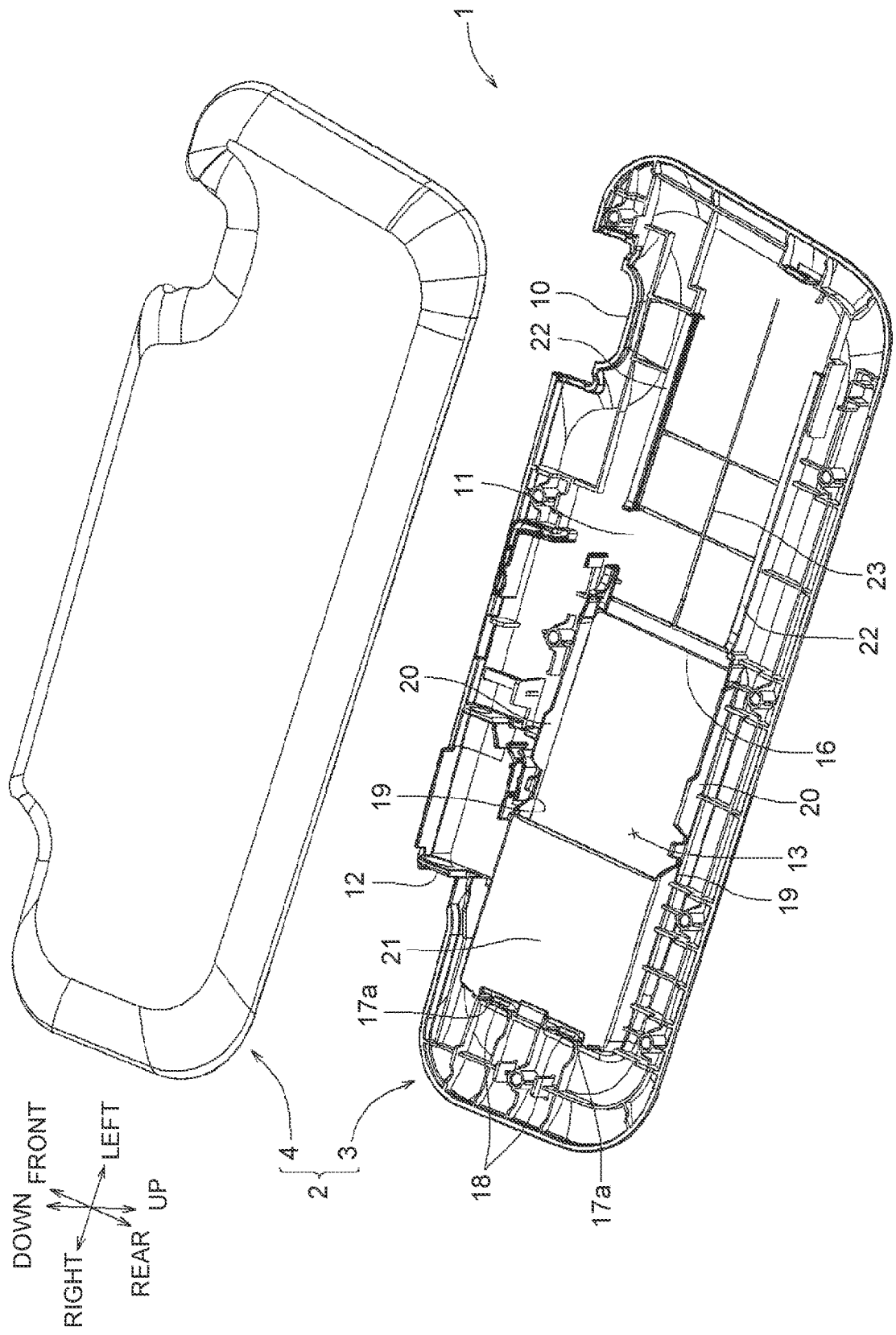
FIG. 3 is a perspective view of the sun visor body in FIG. 2 as viewed from the opposite side.

A cutout 10 is formed on the left front side of the outer surface 15 of the one half body 3 (see FIG. 2). Also, a bearing portion 12 that receives the arm 6 inserted in a clip 34 fitted to a clip fitting portion 33 of the later-described other half body 4 is formed on the right front side of an inner surface 11 of the one half body 3 (see FIG. 3). Also, a rectangular opening 13 that allows a later-described mirror unit 5 to be fitted therein is formed in the one half body 3. A stepped portion 14 forming a recess is formed in each of short edges 16 and long edges 19 of the opening 13.

A depth of the recess of each stepped portion 14 is set so as to substantially correspond to a thickness of a frame 40 of the later-described mirror unit 5. Consequently, it is possible to make the frame 40 of the fitted mirror unit 5 be flush with the outer surface 15 (decorative surface) of the one half body 3 when the mirror unit 5 is fitted in the one half body 3. Therefore, the one half body 3 with the mirror unit 5 fitted therein can be enhanced in design.

Also, at one short edge 16 of the opening 13, a reinforcement member 17 is formed so as to extend inward (toward the other half body 4) (see FIG. 2). Cutouts 17a are formed so as to be paired in the reinforcement member 17. At each of the cutouts 17a, an engagement lug 18 is formed so as to extend inward from the one short edge 16. In other words, a pair of engagement lugs 18 is formed at the reinforcement member 17. Also, at each of the long edges 19 of the opening 13, a reinforcement member 20 is formed so as to extend inward (toward the other half body 4).

A bridging member 21 is provided so as to bridge the reinforcement members 20 facing each other. The reinforcement members 17, 20 and the bridging member 21 enable enhancement in rigidity of the one half body 3 even though the opening 13 is formed in the one half body 3. Also, at the inner surface 11 of the one half body 3, a pair of auxiliary guide rails 22 capable of guiding a pair of long edges 65 of a slide cover 60 of the later-described mirror unit 5 is formed in such a manner that each of the auxiliary guide rails 22 forms a substantially U-shape in cross-section (see FIG. 3).

Therefore, the pair of auxiliary guide rails 22 are formed to be positioned on respective extensions of a pair of side walls 41 of the frame 40 of the mirror unit 5 fitted in the one half body 3. Also, a group of ribs 23 arrayed substantially two-dimensionally is formed at the inner surface 11 of the one half body 3. Consequently, strength necessary for the one half body 3 itself can be ensured. Note that a distance between the pair of auxiliary guide rails 22 is denoted as "W4" (see FIG. 7). The one half body 3 is configured as described above. The thus-configured one half body 3 is molded as a single piece using a synthetic resin having rigidity (for example, PP).

Here, the mirror unit 5 fitted in the above-described one half body 3 will be described in detail with reference to FIGS. 4 to 6. The mirror unit 5 is formed of the frame 40, a mirror 50, the slide cover 60, a slide mechanism 70 and a position holding mechanism 80 (see FIGS. 4 to 6).

First, the frame 40, the mirror 50, the slide cover 60, the slide mechanism 70 and the position holding mechanism 80 will be described individually.

Figure 4:
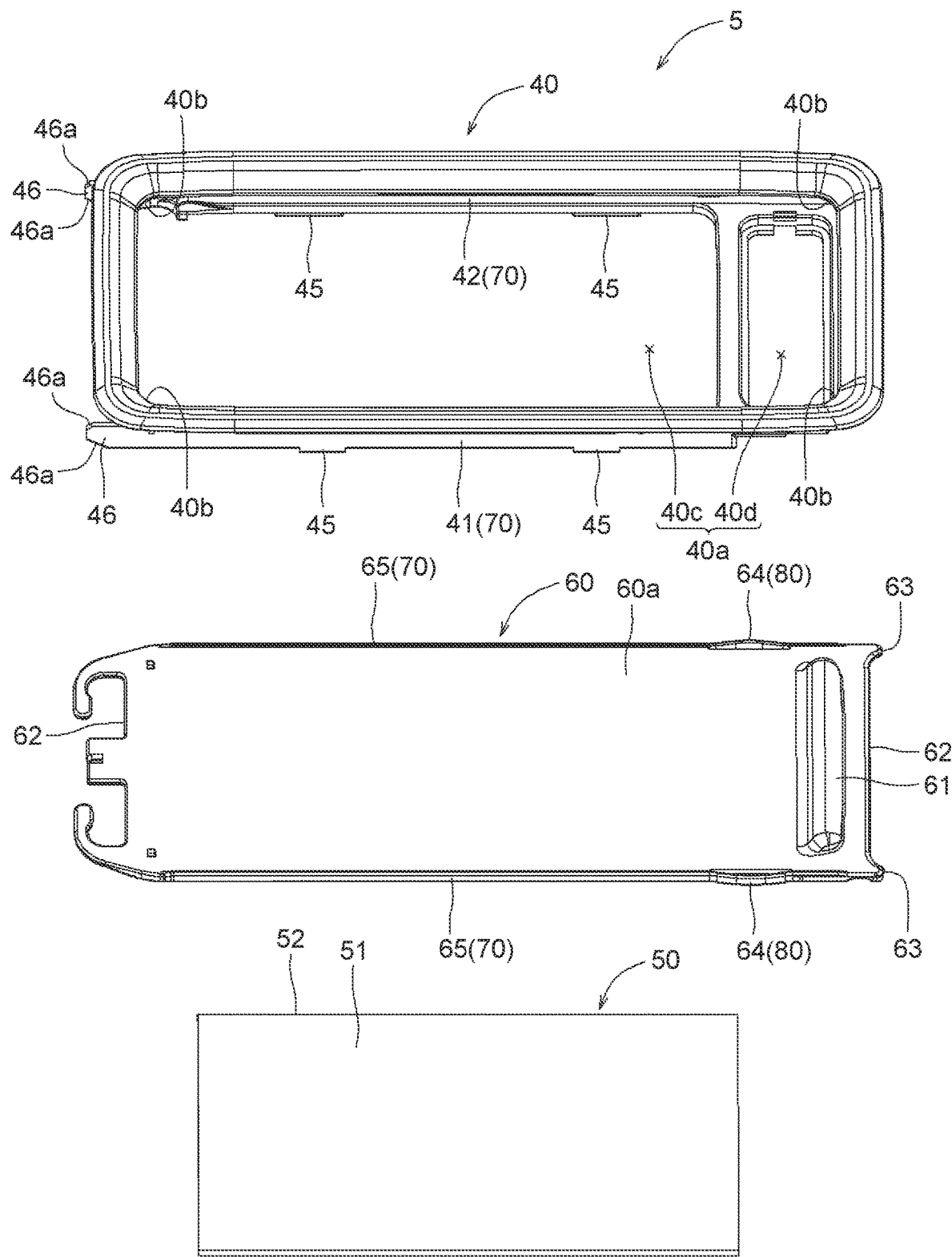
FIG. 4 is an exploded view of the mirror unit in FIG. 1.
Figure 5:
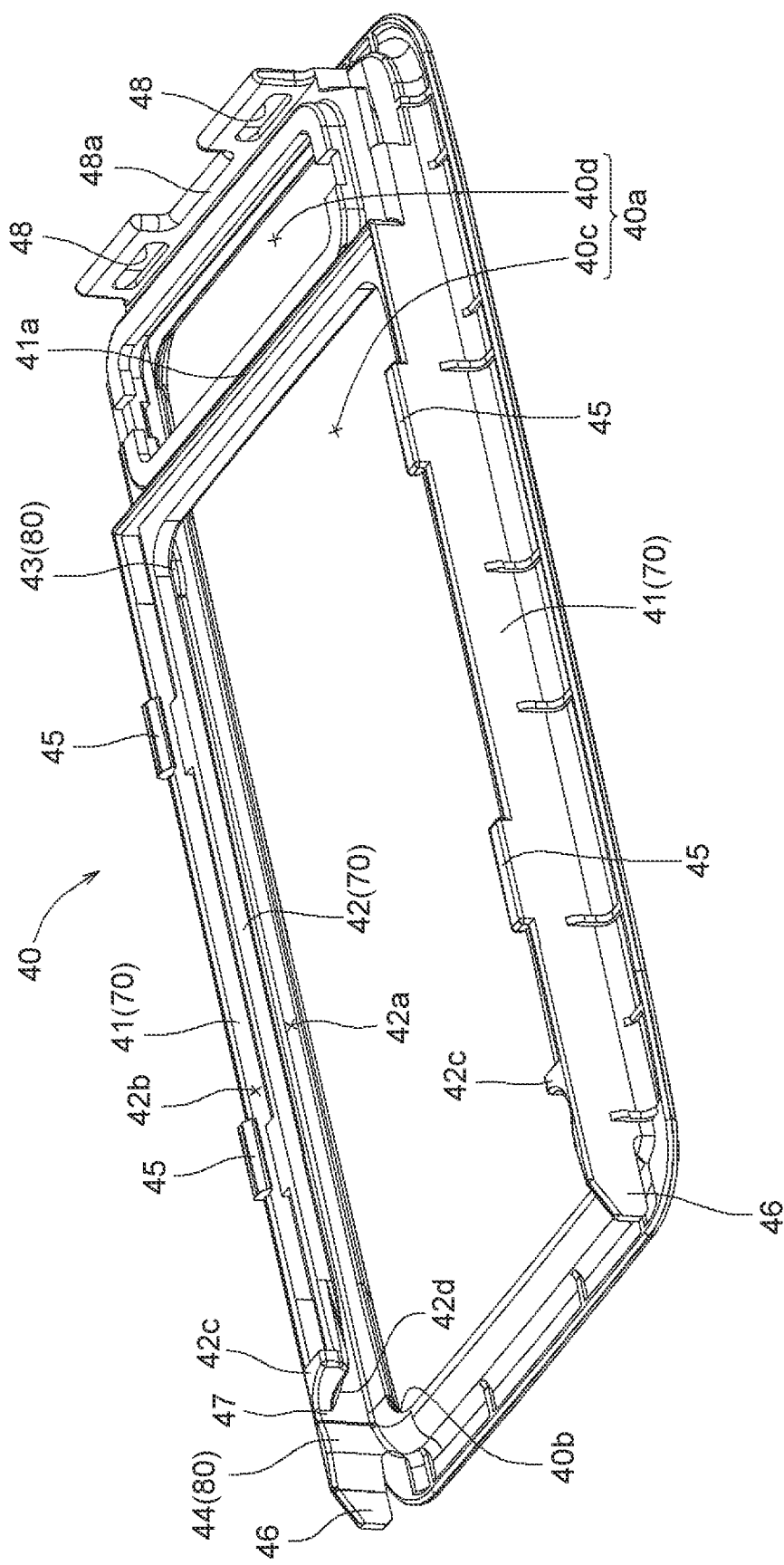
FIG. 5 is a perspective view of the frame in FIG. 4 as viewed from the opposite side.
Figure 6:
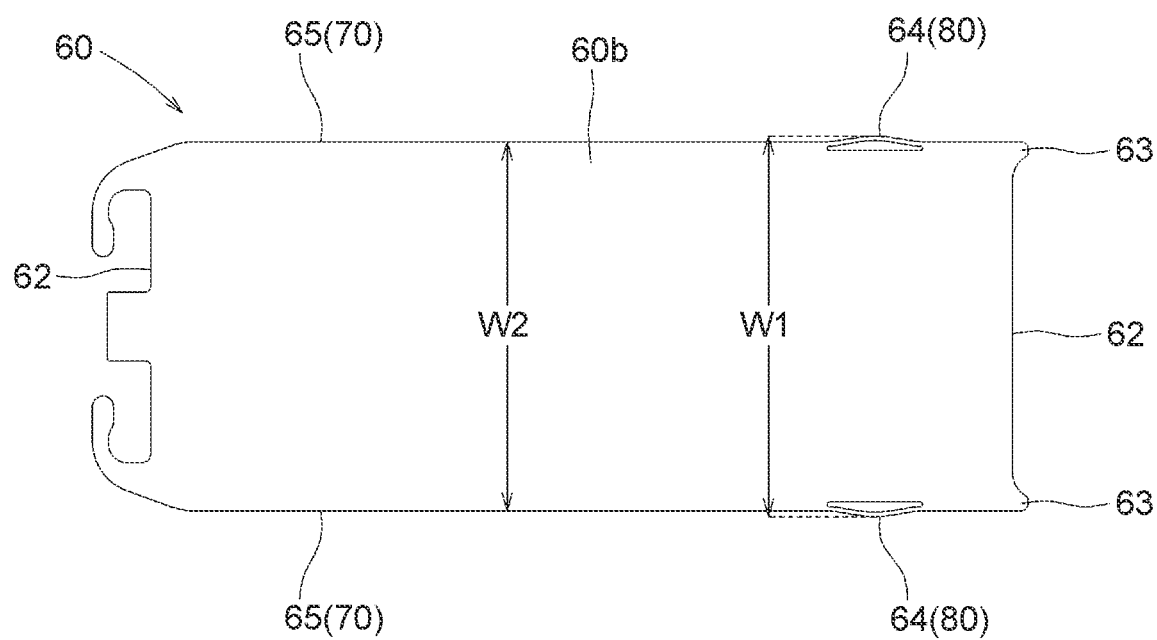
FIG. 6 is a schematic diagram of the slide cover in FIG. 4.

The frame 40 is formed of a rectangular frame-like member including a main opening 40a, each of four corners of the main opening 40a forming an R portion 40b (see FIGS. 4 and 5). The main opening 40a includes a first auxiliary opening 40c for the later-described mirror 50 and a second auxiliary opening 40d for a lamp unit (not illustrated) neighboring the first auxiliary opening 40c. A side wall 41 is formed at each of opposite ends in a longitudinal direction of the frame 40. Respective one end sides of the side walls 41 (distal end side in a closing direction of the slide cover 60) are bridged by a bridging member 41a.

Also, at an inner surface of each side wall 41, a retainer portion 42 is formed along the longitudinal direction. Consequently, it is possible to provide attachment recess portions (stepped portions) 42b that allow the later-described mirror 50 to be attached thereto on the outer side of the respective retainer portions 42 while securing slide grooves 42a that allow respective long edges 65 of the slide cover 60 to slide thereon on the inner side of the retainer portion 42.

The pair of side walls 41 and the respective retainer portions 42 correspond to "a pair of main guide rails" recited in the claims.

A block 42c is formed on the one end side of each retainer portion 42 (distal end side in an opening direction of the slide cover 60). A curved surface 42d that curves toward the relevant slide groove 42a is formed on the lower side of each block 42c (side of each block 42c, the side facing the frame 40). Consequently, when the slide cover 60 is attached to the pair of side walls 41 and the respective retainer portions 42 (and the pair of slide groove 42a) of the frame 40 such that the pair of long edges 65 are guided respectively as described later, the slide cover 60 can be inserted obliquely relative to the pair of side walls 41 and the respective retainer portions 42 such that a handle 61 of the slide cover 60 climbs over the frame 40.

Also, a first protrusion portion 43 capable of bending the corresponding resin spring 64 of the later-described slide cover 60 is formed on the one end side of each side wall 41 (distal end side in the closing direction of the slide cover 60). The first protrusion portions 43 are formed at the pair of side walls 41 so as to face each other. Consequently, sliding of the resin springs 64 (slide cover 60) can be restricted so as to hold the slide cover 60 at a closed position. The closed position refers to a position at which the slide cover 60 covers a mirror surface 51 of the mirror 50.

Also, a second protrusion portion 44 capable of bending the corresponding resin spring 64 of the later-described slide cover 60 is formed on the other end side of each side wall 41 (distal end side in the opening direction of the slide cover 60). The second protrusion portions 44 are formed at the pair of side walls 41 so as to face each other. Consequently, sliding of the resin springs 64 (slide cover 60) can be restricted so as to hold the slide cover 60 at an open position. The open position refers to a position at which the slide cover 60 makes the mirror surface 51 of the mirror 50 be exposed.

Also, engagement lugs 45 that prevent the mirror 50 attached to the attachment recess portions 42b from coming off are formed on the one end side and the other end side of each side wall 41. Also, a guide piece 46 is formed at the other end of each side wall 41. Consequently, holding of the pair of resin springs 64 of the slide cover 60 at the open position can be performed by the guide pieces 46. Also, "W6", which is a distance between the pair of guide pieces 46, is substantially the same as "W1", which is a distance between the pair of resin springs in a natural state.

Note that opposite corners on the distal end side of each guide piece 46 are chamfered (chamfered portions 46a). Therefore, as described later, when the mirror unit 5 is fitted in the one half body 3, the pair of guide pieces 46 of the mirror unit 5 is easily caught on the other short edge 16 of the one half body 3. Also, a recess portion 47 that forms an outward recess is formed on the other end side of each side wall 41 (see FIG. 5). Also, a pair of engagement holes 48 engageable with the pair of engagement lugs 18 of the one half body 3 is formed at an edge at a lateral direction of the frame 40, the edge facing the pair of guide pieces 46.

Figure 7:
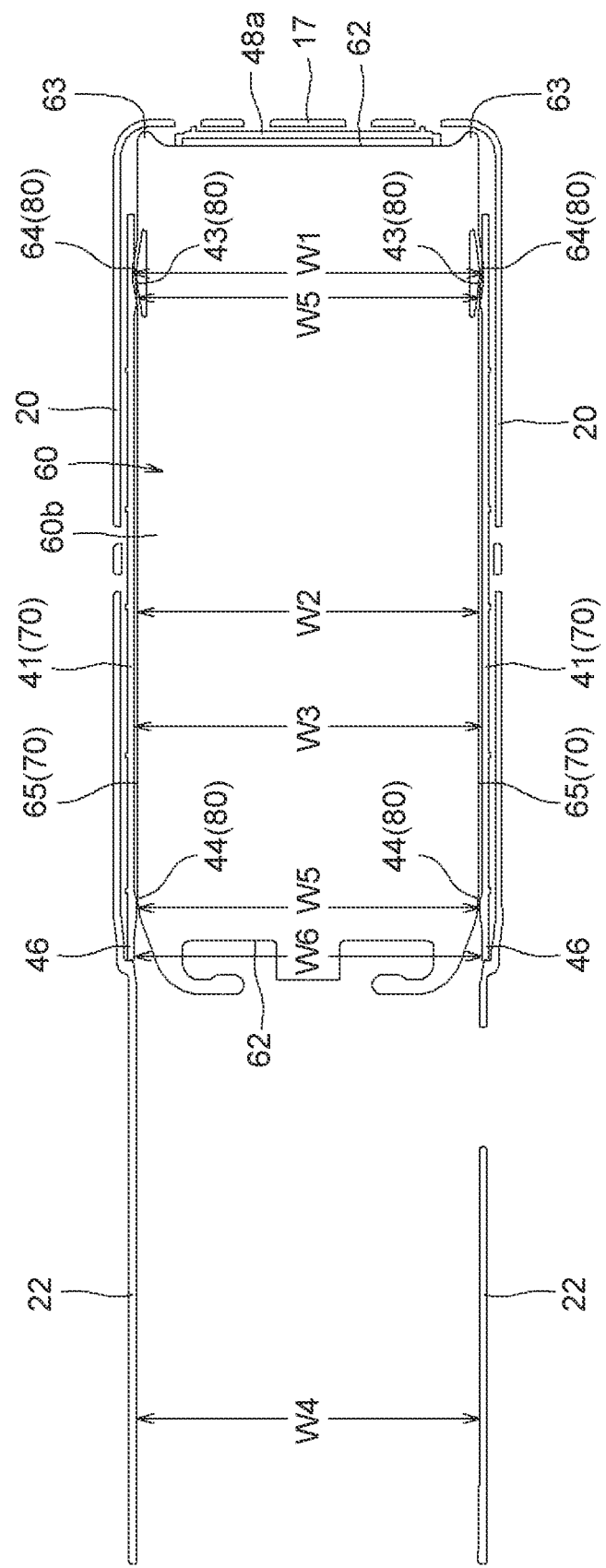
FIG. 7 is a diagram illustrating a state when the slide cover in FIG. 6 is at a closed position.

Note that a distance between the pair of side walls 41 is denoted as "W3" (see FIG. 7). Also, each of a distance between the first protrusion portions 43 facing each other and a distance between the second protrusion portions 44 facing each other is denoted as "W5" (see FIG. 7). The frame 40 is configured as described above. The thus-configured frame 40 is molded as a single piece using a synthetic resin having rigidity (for example, PP).

Also, the mirror 50 is formed of a glass member including a mirror surface 51 on a surface on one side thereof (see FIG. 4). Therefore, the mirror surface 51 can provide a reflection of a human being or an object (not illustrated). The mirror 50 is formed so as to have a size conforming to a rectangular shape surrounded by the pair of side walls 41, the bridging member 41a and the pair of blocks 42c of the frame 40.

Also, the slide cover 60 is attachable to the frame 40 and is formed of a rectangular lid member capable of closing the main opening 40a of the frame 40 (see FIG. 4). The handle 61 having a protruding shape is formed on the one end side of an outer surface 60a of the slide cover 60 (distal end side in the closing direction of the slide cover 60). Consequently, a finger (not illustrated) can be made to catch the handle 61 to slide the slide cover 60. Therefore, slippage of the finger relative to the slide cover 60 can be prevented.

Also, respective protruding corner portions 63 are formed at opposite ends of a short edge 62 on the one end side of the slide cover 60 (distal end side in the closing direction of the slide cover 60). Consequently, when the slide cover 60 is slid to the closed position, generation of a gap at the corners of the main opening 40a can be prevented even though the R portions 40b are formed at the corners of the main opening 40a of the frame 40. Therefore, enhancement in design of the mirror unit 5 when the slide cover 60 is closed is enabled.

Also, a resin spring 64 is formed on the one end side of each long edge 65 of the slide cover 60 (distal end side in the closing direction of the slide cover 60). The resin springs 64 are formed at the pair of long edges 65 so as to face each other. Note that the distance between the pair of resin springs in a natural state is denoted as "W1" (see FIG. 6). Also, a rib (not illustrated) is formed at each of the long edges 65 in a longitudinal direction of an inner surface 60b of the slide cover 60.

A recess portion (not illustrated) is formed on the one end side of each rib (distal end side in the opening direction of the slide cover 60). Each recess portion is formed at a part that faces the corresponding curved surface 42d of the frame 40 in a state in which the later-described slide cover 60 is inserted obliquely. Note that a width between the long edges 65 of a slide of the slide cover 60 is denoted as "W2" (see FIG. 6). The slide cover 60 is configured as described above. The thus-configured slide cover 60 is molded as a single piece using a synthetic resin having rigidity (for example, PP).

Also, the slide mechanism 70 is formed of the pair of side walls 41 and the respective retainer portions 42 of the frame 40 and the pair of long edges 65 of the slide cover 60. Also, the position holding mechanism 80 is formed of the pair of first protrusion portions 43 and the pair of second protrusion portions 44 of the side wall 41 of the frame 40 and the pair of resin springs 64 of the slide cover 60.

The sun visor 1 is formed of the above-described sun visor body 2, the arm 6 and the coating. Note that in the sun visor 1, the below three relationships (first to third relationships) hold. The first relationship is "W1", which is the distance between the pair of resin springs in a natural state>"W3", which is the distance between the pair of side walls 41. The second relationship is "W3", which is the distance between the pair of side walls 41>"W4", which is the distance between the pair of auxiliary guide rails 22. The third relationship is "W3", which is the distance between the pair of side walls 41>"W5", which is the distance between the first protrusion portions 43 facing each other and is also the distance between the second protrusion portions 44 facing each other.

Figure 8:
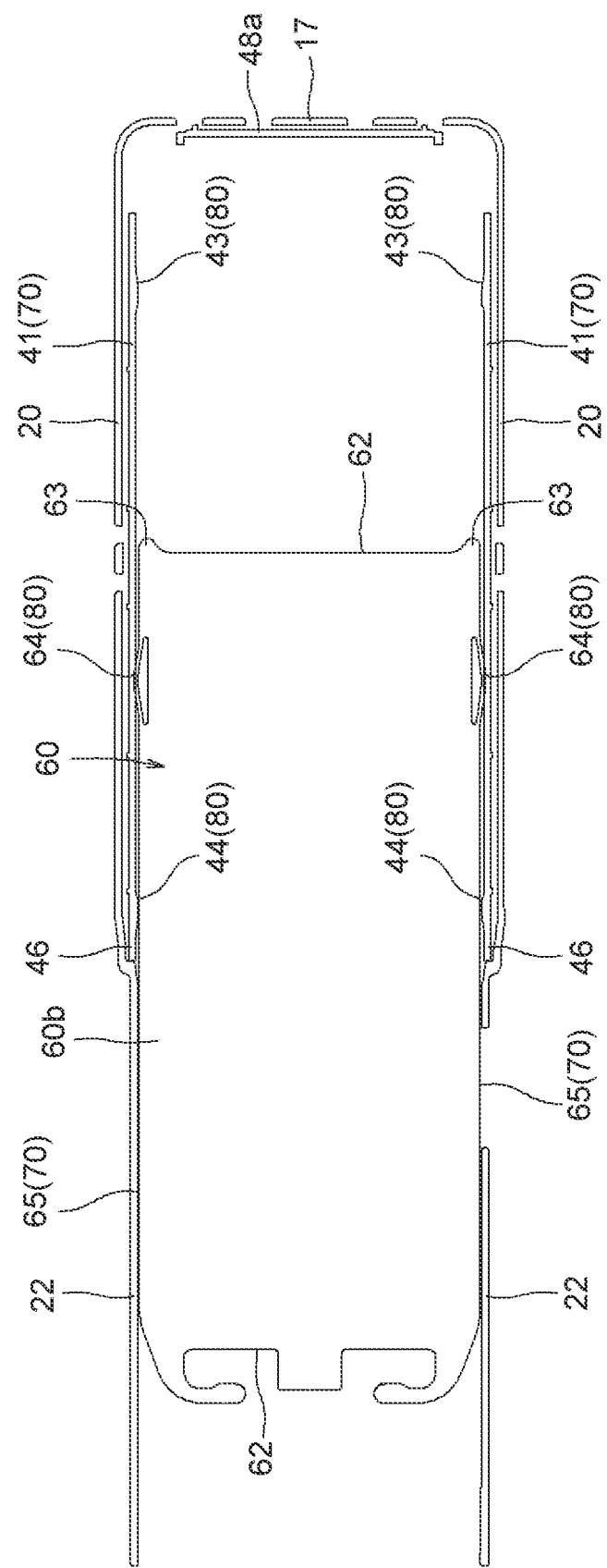
FIG. 8 is a diagram illustrating a state when the slide cover is being slid toward an open position.

Lastly, operation of the above-described sun visor 1 will be described with reference to FIGS. 7 to 9. First, as illustrated in FIG. 7, a state when the slide cover 60 is at the closed position will be described. When the slide cover 60 is at the closed position, the relevant short edge 62 of the slide cover 60 and a stopper 48a of the frame 40 interfere with each other. Therefore, further sliding in the closing direction of the slide cover 60 is restricted. Also, when the slide cover 60 is at the closed position, the pair of resin springs 64 and the pair of first protrusion portions 43 of the frame 40 interfere with each other. Therefore, sliding in the opening direction of the slide cover 60 is restricted. As a result, when the slide cover 60 is at the closed position, the slide of the slide cover 60 is held.

From this state, the slide cover 60 is slid toward the open position. Then, the pair of resin springs 64 of the slide cover 60 are bent and the pair of bent resin springs 64 climb over the pair of first protrusion portions 43. Consequently, the slide cover 60 can be slid toward the open position. Upon the slide cover 60 being slid in such a manner as above, the mirror surface 51 of the mirror 50 starts being exposed. Note that the pair of bent resin springs 64 return to the original state after climbing over the pair of first protrusion portions 43.

Figure 9:
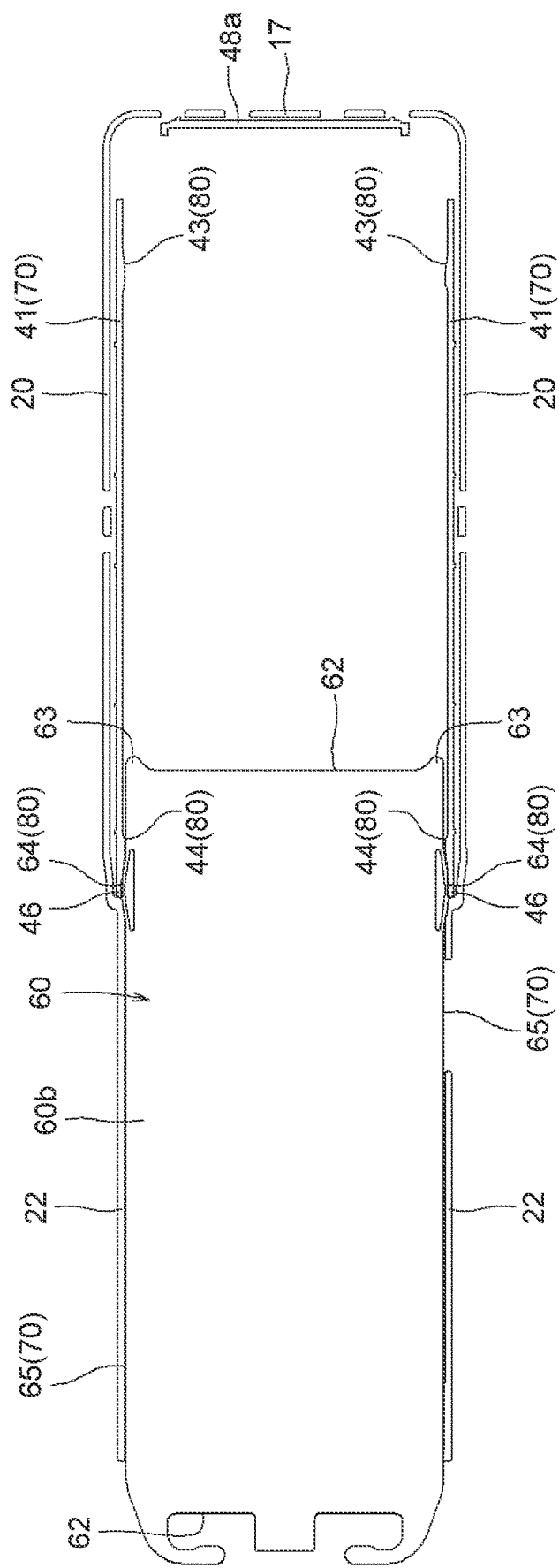
FIG. 9 is a diagram illustrating a state when the slide cover is at the open position.
Figure 10:
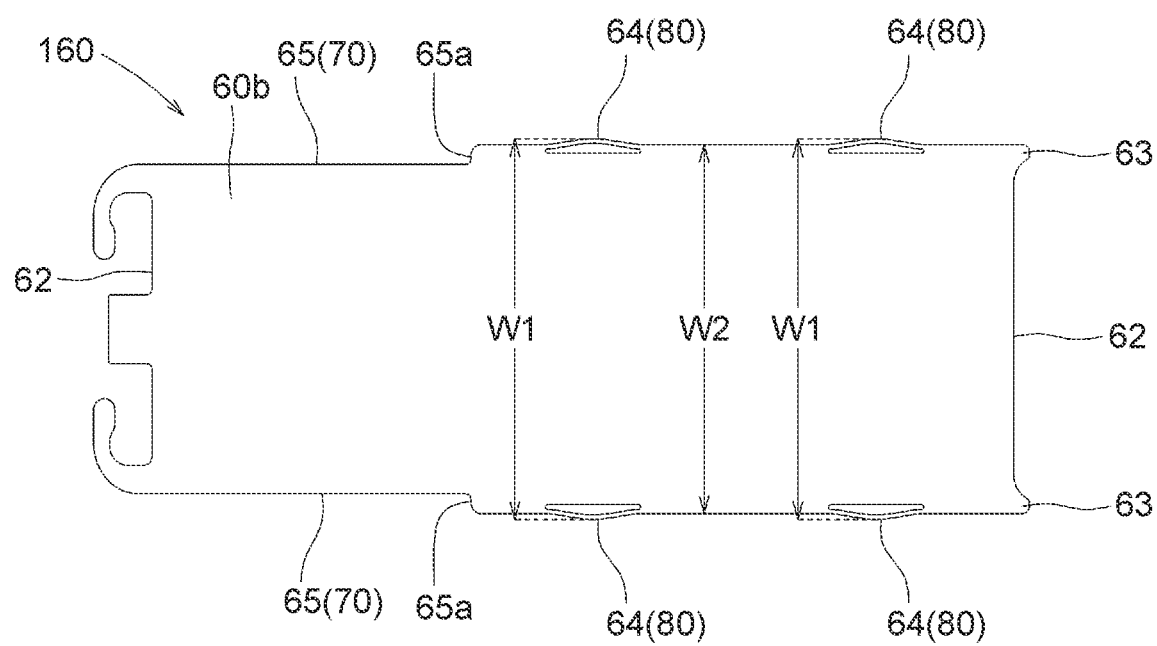
FIG. 10 is a schematic diagram of a slide cover according to a second embodiment.
Figure 11:
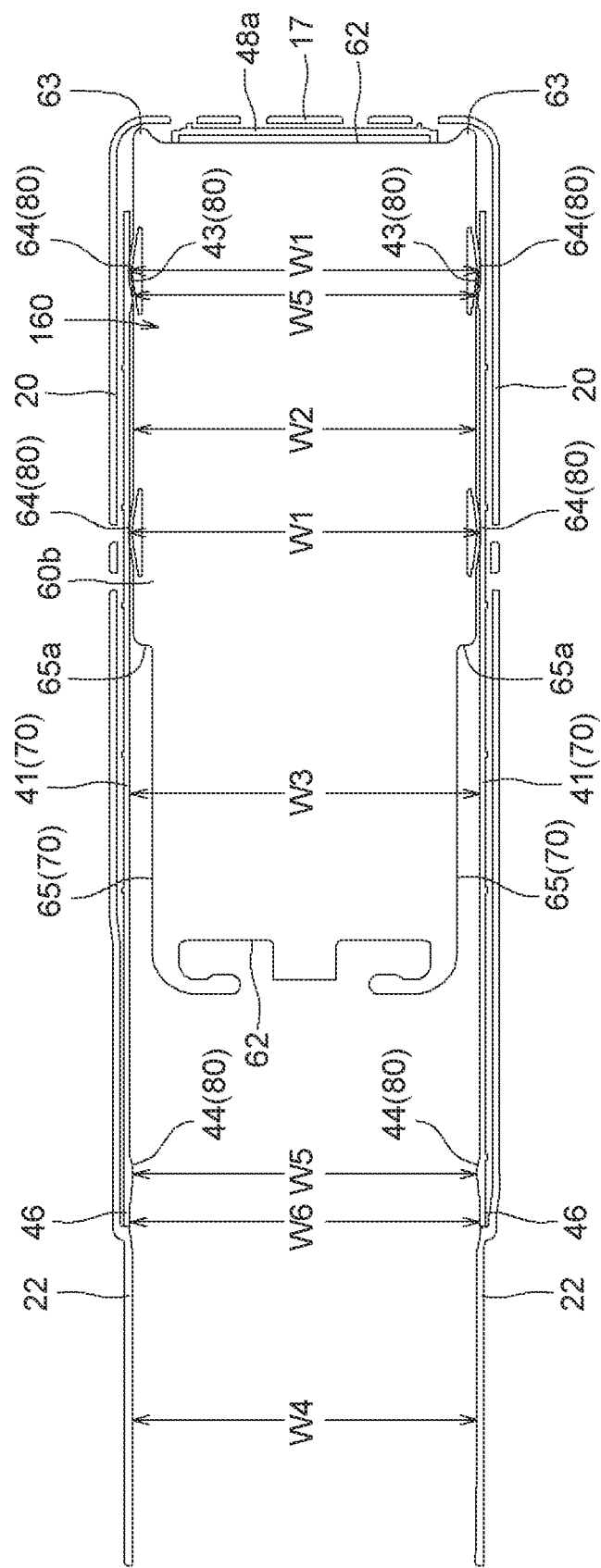
FIG. 11 is a diagram illustrating a state when the slide cover in FIG. 10 is at a closed position.
Figure 12:
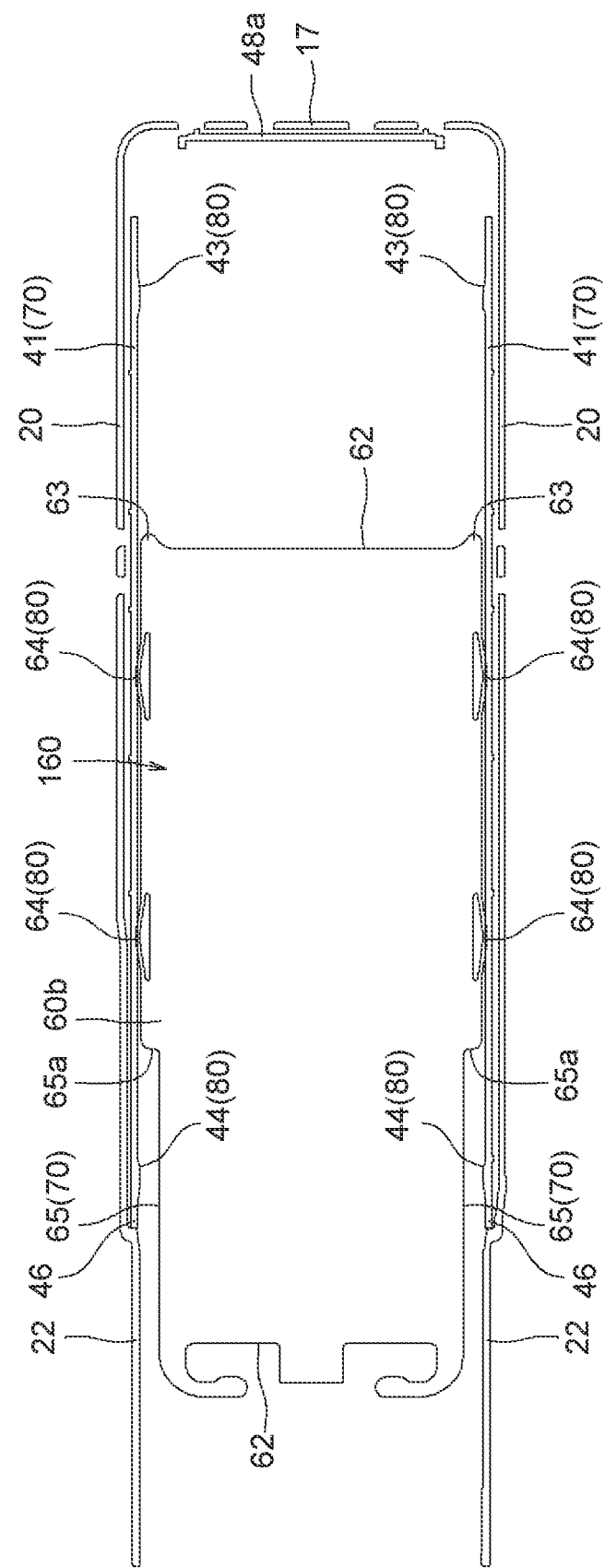
FIG. 12 is a diagram illustrating a state when the slide cover is being slid toward an open position.
Figure 13:
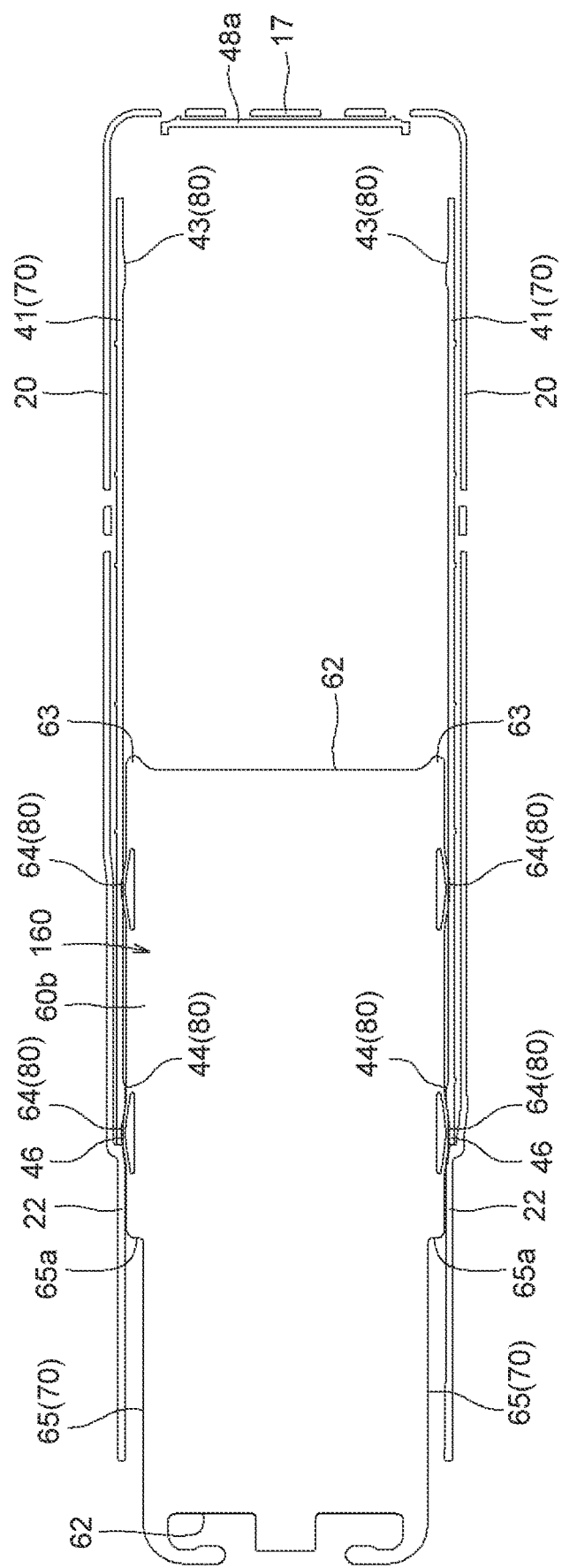
FIG. 13 is a diagram illustrating a state when the slide cover is at the open position.

Upon the slide cover 60 being further slid toward the open position (see FIG. 8), the pair of long edges 65 of the slid slide cover 60 is guided by the pair of auxiliary guide rails 22, the pair of resin springs 64 of the slide cover 60 are bent again and the pair of bent resin springs 64 climb over the pair of second protrusion portions 44 (see FIG. 9). Simultaneously, the handle 61 of the slide cover 60 and the frame 40 interfere with each other. Therefore, further sliding in the opening direction of the slide cover 60 is restricted. Consequently, sliding of the slide cover 60 toward the open position is completed. In other words, the slide cover 60 is switched to the open position.

Upon the switching as above (the slide cover 60 reaching the open position), an occupant can see his/her face in the mirror surface 51 because the mirror surface 51 of the mirror 50 is exposed. Note that the pair of bent resin springs 64 return to the original state after climbing over the pair of second protrusion portions 44. Therefore, when the slide cover 60 is at the open position, the pair of resin springs 64 and the pair of second protrusion portions 44 of the frame 40 interfere with each other. Therefore, sliding in the closing direction of the slide cover 60 is restricted. As a result, when the slide cover 60 is at the open position, also, the slide of the slide cover 60 is held. Note that returning of the slide cover 60 from the open position to the closed position can be performed similarly by operation according to a procedure that is the reverse of the above-described procedure.

The sun visor 1 according to the first embodiment of the present invention is configured as described above. This configuration provides the first relationship. In other words, "W1", which is the distance between the pair of resin springs in a natural state>"W3", which is the distance between the pair of side walls 41. Therefore, when the slide cover 60 is slid, the pair of resin springs 64 are bent. Therefore, backlash of the slide cover 60 during the sliding can be curbed. Also, this configuration provides the second relationship. In other words, "W3", which is the distance between the pair of side walls 41>"W4", which is the distance between the pair of auxiliary guide rails 22. Therefore, in the pair of auxiliary guide rails 22, backlash caused by sliding of the slide cover 60 on the pair of auxiliary guide rails 22 can be curbed even though the pair of resin springs 64 of the slide cover 60 do not work. Also, this configuration provides the third relationship. In other words, "W3", which is the distance between the pair of side walls 41>"W5", which is the distance between the first protrusion portions 43 facing each other and is also the distance between the second protrusion portions 44 facing each other. Therefore, the slide cover 60 can be held at the open position (position at which the mirror surface 51 of the mirror 50 is exposed) and the closed position (position at which the mirror surface 51 of the mirror 50 is covered). Also, the pair of resin springs 64 of the slide cover 60 are slightly bent except when the pair of resin springs 64 climb over the pair of first protrusion portions 43 and the pair of second protrusion portions 44. Therefore, plastic deformation of the pair of resin springs 64 can be prevented.

Also, according to this configuration, the guide pieces 46 are formed at the respective other ends of the pair of side walls 41. "W6", which is the distance between the pair of guide pieces 46 is substantially the same as "W1", which is the distance between the pair of resin springs in a natural state. Therefore, holding of the pair of resin springs 64 of the slide cover 60 at the open position can be performed by deformation of the guide pieces 46. Such performance prevents the pair of resin springs 64 from plastic deformation when the pair of resin springs 64 are held because the guide pieces 46 have a bending property. In other words, holding of the slide cover 60 at the open position can be performed without plastic deformation of the pair of resin springs 64 of the slide cover 60.

Second Embodiment

Next, a second embodiment of the present invention will be described with reference to FIGS. 10 to 13. In comparison with the already-described first embodiment, the second embodiment has a configuration in which upon a slide cover 160 being slid from a closed position to an open position, a lamp of a lamp unit (not illustrated) is turned on. In the below description, members that are the same as those described in the first embodiment are provided with reference numerals that are the same as those of the first embodiment in the drawings to omit overlapping descriptions.

A stepped portion 65a that narrows a width on the opening direction side of the slide cover 60 is formed at each of a pair of long edges 65a of the slide cover 160 (see FIGS. 10 to 13). As a result of the stepped portions 65a being formed as above, when the slide cover 60 is slid from the open position to the closed position, an operation section (not illustrated) of a switch is caught on the stepped portions 65a. Therefore, the switch can be turned on and thus the lamp of the lamp unit can be turned on. Note that when the slide cover 60 is slid from the open position to the closed position, the operation section of the switch is released from being caught. Therefore, the switch can be turned off and thus the lamp of the lamp unit can be turned off.

The above-described contents are definitely embodiments of the present invention and do not intend to limit the present invention to the contents.

Each of the embodiments has been described in terms of the configuration in which the frame 40 is included in the mirror unit 5. However, the present invention is not limited to this configuration and the frame 40 may be included in the one half body 3.

Also, each of the embodiments has been described in terms of the configuration in which resin springs 64 are paired (are formed on the opposite sides of each long edge 65). However, the present invention is not limited to this configuration, and a resin spring 64 may be formed only on one side (only on one side of each long edge 65) without forming a pair.

REFERENCE SIGNS LIST

1 SUN VISOR (VEHICLE SUN VISOR)
2 SUN VISOR BODY
3 ONE HALF BODY
4 OTHER HALF BODY
5 MIRROR UNIT
11 INNER SURFACE
40 FRAME
41 SIDE WALL (MAIN GUIDE RAIL)
42 RETAINER PORTION (MAIN GUIDE RAIL)
42d CURVED SURFACE
43 FIRST PROTRUSION PORTION
44 SECOND PROTRUSION PORTION
50 MIRROR
51 MIRROR SURFACE
60 SLIDE COVER
61 HANDLE
64 RESIN SPRING
65 LONG EDGE
70 SLIDE MECHANISM
80 POSITION HOLDING MECHANISM

The invention claimed is:

1. A vehicle sun visor comprising a sun visor body including a pair of shell-like half bodies, and a mirror unit fitted in one half body of the sun visor body,
the mirror unit including
a frame provided separately from or integrally with the one half body,
a mirror attached to the frame,
a slide cover attached to the frame,
a slide mechanism that allows the slide cover to slide between an open position at which a mirror surface of the mirror is exposed and a closed position at which the slide cover covers the mirror surface of the mirror, relative to the frame, and
a position holding mechanism capable of holding the slide cover slid via the slide mechanism at the closed position and the open position,
the slide mechanism including a pair of main guide rails that guide opposite edges of a slide that allows the slide cover to slide,
the position holding mechanism including
a pair of resin springs formed at the opposite edges of the slide of the slide cover, the opposite edges being guided by the slide mechanism,
first protrusion portions formed at the pair of main guide rails so as to face each other, the first protrusion portions restricting sliding of the resin springs so as to hold the slide cover at the closed position, and
second protrusion portions formed at the pair of main guide rails so as to face each other, the second protrusion portions restricting sliding of the resin springs so as to hold the slide cover at the open position,
a pair of auxiliary guide rails that when the slide cover is slid from the closed position toward the open position, guides the opposite edges of the slide of the slide cover advanced from the pair of main guide rails being formed at an inner surface of the one half body, wherein
among a distance between the pair of resin springs in a natural state, a width between the opposite edges of the slide of the slide cover, a distance between the pair of main guide rails, a distance between the pair of auxiliary guide rails and respective distances between the protrusion portions facing each other at the pair of main guide rails,
the distance between the pair of resin springs in a natural state greater than the distance between the pair of main guides rails greater than the respective distances between the protrusion portions facing each other at the pair of main guide rails, and the distance between the pair of main guide rails greater than the distance between the pair of auxiliary guide rails.

2. The vehicle sun visor according to claim 1, wherein guide pieces that hold the pair of resin springs of the slide cover at the open position of the slide cover is formed at respective end portions of the pair of main guide rails.

* * * * *